US009465522B2

(12) United States Patent
Prasad et al.

(10) Patent No.: US 9,465,522 B2
(45) Date of Patent: Oct. 11, 2016

(54) PROVIDING A PERSONALIZED NAVIGATION EXPERIENCE IN A MOBILE APPLICATION

(71) Applicant: LinkedIn Corporation, Mountain View, CA (US)

(72) Inventors: Srikiran Prasad, Santa Clara, CA (US); Akhilesh Gupta, Los Altos, CA (US); Tomer Cohen, Mountain View, CA (US); Leah McGuire, Mountain View, CA (US)

(73) Assignee: LinkedIn Corporation, Mountain View, CA (US)

( * ) Notice: Subject to any disclaimer, the term of this patent is extended or adjusted under 35 U.S.C. 154(b) by 259 days.

(21) Appl. No.: 13/853,948

(22) Filed: Mar. 29, 2013

(65) Prior Publication Data

US 2014/0298194 A1  Oct. 2, 2014

Related U.S. Application Data

(60) Provisional application No. 61/806,221, filed on Mar. 28, 2013.

(51) Int. Cl.
| | | |
|---|---|---|
| *G06F 3/0481* | (2013.01) | |
| *G06F 3/0484* | (2013.01) | |
| *G06F 3/0482* | (2013.01) | |
| *G06F 17/30* | (2006.01) | |
| *G06Q 30/02* | (2012.01) | |

(52) U.S. Cl.
CPC ........... *G06F 3/0484* (2013.01); *G06F 3/0481* (2013.01); *G06F 3/0482* (2013.01); *G06F 17/30867* (2013.01); *G06Q 30/0241* (2013.01)

(58) Field of Classification Search
CPC ... G06F 3/0481; G06F 3/0482; G06F 9/4443
See application file for complete search history.

(56) References Cited

U.S. PATENT DOCUMENTS

| | | | | |
|---|---|---|---|---|
| 6,807,583 | B2* | 10/2004 | Hrischuk | G06F 9/542 702/182 |
| 8,219,071 | B2* | 7/2012 | Kokubo | H04M 1/72522 370/256 |
| 8,233,879 | B1* | 7/2012 | Lee | H04L 41/00 455/405 |
| 8,924,942 | B1* | 12/2014 | Makuch | G06F 9/44 715/762 |
| 8,935,393 | B1* | 1/2015 | Jackson | H04L 43/04 709/224 |
| 2003/0030666 | A1* | 2/2003 | Najmi | G06F 3/0482 715/745 |
| 2003/0163365 | A1* | 8/2003 | Farnes | G06Q 10/06311 705/7.21 |
| 2003/0236775 | A1* | 12/2003 | Patterson | G06F 9/4443 |
| 2008/0046840 | A1* | 2/2008 | Melton et al. | 715/825 |
| 2008/0052373 | A1* | 2/2008 | Pousti | 709/217 |
| 2008/0134043 | A1* | 6/2008 | Georgis et al. | 715/733 |

(Continued)

*Primary Examiner* — Phenuel Salomon
(74) *Attorney, Agent, or Firm* — Park, Vaughan, Fleming & Dowler LLP

(57) ABSTRACT

The disclosed embodiments relate to a system for presenting navigation options to a user of a mobile application. During operation, the system receives usage data comprising a record of actions performed while the user was interacting with the mobile application. Next, the system analyzes the usage data to identify areas of interest within the mobile application that the user is likely to access. The system then constructs a set of personalized navigation options for the user based on the identified areas of interest, and possibly other areas of the application based on promotional considerations. Finally, the system outputs the set of personalized navigation options to be presented to the user through a navigation pane in the mobile application, wherein the navigation pane includes shortcuts to the set of personalized navigation options.

21 Claims, 7 Drawing Sheets

(56) References Cited

U.S. PATENT DOCUMENTS

| | | | |
|---|---|---|---|
| 2009/0138593 A1* | 5/2009 | Kalavade | 709/224 |
| 2010/0062811 A1* | 3/2010 | Park et al. | 455/566 |
| 2011/0072492 A1* | 3/2011 | Mohler et al. | 726/3 |
| 2012/0023095 A1* | 1/2012 | Wadycki et al. | 707/723 |
| 2012/0047509 A1* | 2/2012 | Ben-Itzhak | 718/103 |
| 2012/0303552 A1* | 11/2012 | Zayas et al. | 705/400 |
| 2012/0310739 A1* | 12/2012 | Watfa et al. | 705/14.58 |
| 2013/0107783 A1* | 5/2013 | Shaw | 370/312 |
| 2013/0281077 A1* | 10/2013 | Zou et al. | 455/418 |
| 2013/0339901 A1* | 12/2013 | Kirkham et al. | 715/810 |
| 2014/0088988 A1* | 3/2014 | Fairbrothers et al. | 705/2 |
| 2014/0114901 A1* | 4/2014 | Pradhan et al. | 706/50 |
| 2014/0223353 A1* | 8/2014 | Kirkham et al. | 715/771 |

* cited by examiner

PAGE-SPECIFIC TRACKING INFO 402

| PAGE ID 404 | ACTION ID 406 | ADDITIONAL TRACKING INFO 408 |

ACTION-SPECIFIC TRACKING INFO 412

| ACTION ID 414 | PAGE ID 416 | ADDITIONAL TRACKING INFO 418 |

FIG. 4

PROVIDING A PERSONALIZED NAVIGATION EXPERIENCE IN A MOBILE APPLICATION

This application claims priority to U.S. Patent Application No. 61/806,221, entitled "User Interface for Personalized Navigation" and filed Mar. 28, 2013, which is hereby incorporated by reference.

RELATED ART

The disclosed embodiments generally relate to techniques for navigating among sections of a computer-based application. More specifically, the disclosed embodiments relate to techniques for providing a personalized navigation experience for a user of a mobile application on a mobile computing device.

BACKGROUND

As mobile computing devices, such as smartphones and tablet computers, continue to proliferate, they are rapidly becoming the platform of choice for users who access online applications, such as social-networking portals. However, the process of navigating between sections of a mobile application can be challenging because mobile applications typically have a much smaller screen area to work with than desktop applications, which makes it hard to display a large number of navigation options to a user. Moreover, mobile application users typically select among navigation options by using a finger to tap areas on a touchscreen. However, a user's finger is a relatively blunt instrument in comparison to a cursor in a desktop user interface (UI). Hence, the targets for these touchscreen taps need to be larger than targets for cursor selections in a desktop UI. This means that even fewer navigation options can be presented through a mobile application UI, because each navigation option takes up more screen real estate.

BRIEF DESCRIPTION OF THE FIGURES

FIG. 4 illustrates usage data including page-specific and action-specific tracking information in accordance with the disclosed embodiments.

DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a system reads and executes the code and/or data stored on the non-transitory computer-readable storage medium, the system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

Figure 1:
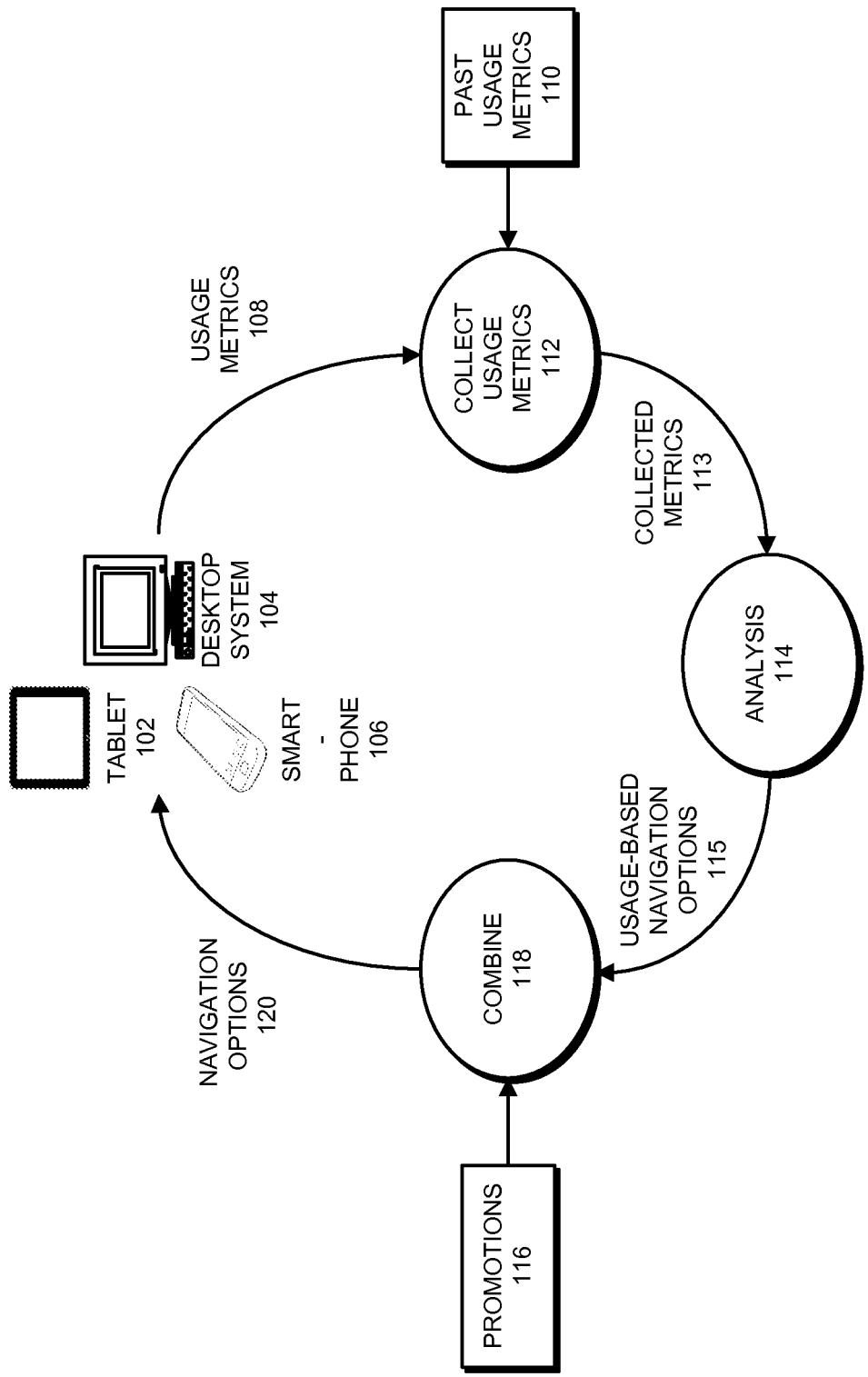
FIG. 1 illustrates a computing environment in accordance with the disclosed embodiments.

The disclosed embodiments relate to a system that presents personalized navigation options to a user of a mobile computing device. At the start of the process, the system collects usage metrics 112. As illustrated in FIG. 1, the collected metrics 113 can include usage metrics 108 gathered during a time interval from a number of computing devices, including, but not limited to, a desktop system 104, a tablet computer 102 and smartphone 106. The collected metrics 113 can also include past usage metrics 110 gathered during one or more preceding time intervals.

In some embodiments, the collected metrics can include actions the user performs while accessing the mobile application, such as tapping, pulling, scrolling or swiping a location on a page of the mobile application. The usage metrics can also include a record of the associated page loads performed by the mobile application in response to the user actions.

Next, the collected metrics 113 feed into an analysis module 114 that analyzes the collected metrics 113 to determine what navigation options the user is likely to select while operating the mobile application. The results of this determination are used to generate a set of usage-based navigation options 115 to display to the user of the mobile device. In some embodiments, this is accomplished by making correlations between the patterns of user actions and page loads in the usage data and actual navigation options performed by the user. This process can also collect feedback during successive iterations of the loop illustrated in FIG. 1, and the feedback can be used by various machine-learning techniques (such as neural-network techniques) to improve the quality of the selected usage-based navigation options 115. Note that the quality of a usage-based navigation option 115 can be assessed by examining whether the selected navigation options are actually selected by the user.

The system then combines 118 the usage-based navigation options 115 with various promotions 116 to produce a set of navigation options 120.

Navigation options 120 are then sent to mobile applications on one or more mobile computing devices associated with the user, such as tablet computer 102 or smartphone 106, and possibly to a desktop system 104 operated by the user. Within the mobile applications, the navigation options 120 are used to display a set of navigation shortcuts to a user of the mobile applications. More specifically, navigation options 120 are used to generate navigation panes containing navigation shortcuts within tablet computer 102, smartphone 106, and possibly even desktop system 104. These navigation panes provide an easy way for the user to access the areas of the application associated with the navigation options 120.

Note that the set of navigation shortcuts that is presented to the user is likely to vary depending upon what computing device the user is operating. For example, a small computing device like a smartphone 106 has only a small amount of screen real estate to present navigation shortcuts, so only a small number of navigation shortcuts can be presented through smartphone 106. In contrast, a tablet computer 102 has relatively more screen real estate and hence is able to present more navigation shortcuts to a user. Finally, a desktop system 104 has an even larger screen and can present an even larger number of navigation shortcuts to the user.

Note than an "area" of the application can include a single page of the application or a set of related (and interlinked) pages of the application. Moreover, an area of the application can be associated with a "product group" within an application, wherein a product group is associated with portions of the application that provide a specific type of functionality or content. For example, in a social-networking application, a "product group" can be associated with an area of the application that provides "connections" from the user to other users in the social-networking site.

Finally, the system completes the loop by collecting more usage metrics 108 from tablet computer 102, smartphone 106 and desktop system 104. This new set of usage metrics 108 feeds back into the system to iteratively create new navigation options 120.

Computing Environment

Figure 2:
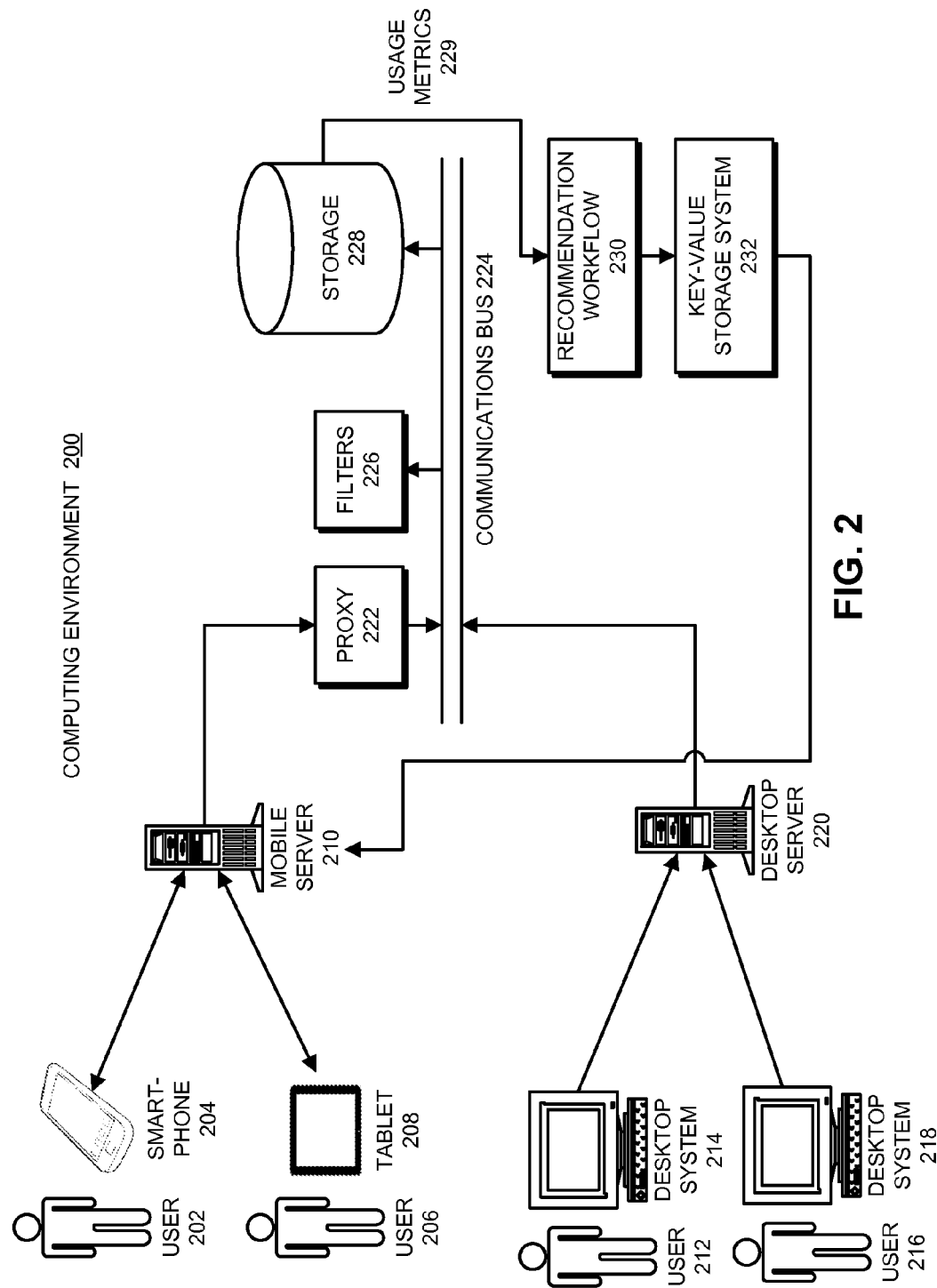
FIG. 2 illustrates a computing environment in accordance with the disclosed embodiments.

FIG. 2 illustrates a computing environment 200 in accordance with the disclosed embodiments. Note that the system illustrated in FIG. 2 gathers usage metrics for mobile applications that act as access gateways to an online application from associated mobile devices, including a smartphone 204 and a tablet computer 208. It also gathers usage metrics for browsers on desktop systems 214 and 218 that access a website associated with the online application.

More specifically, mobile devices 204 and 208, which are operated by users 202 and 206 respectively, execute mobile applications that function as portals to an online application, which is hosted on mobile server 210. (Note that a mobile device can generally include any type of portable electronic device that can host a mobile application, including a smartphone, a tablet computer, a network-connected music player, a gaming console and possibly a laptop computer system.)

Mobile devices 204 and 208 communicate with mobile server 210 through one or more networks (not shown), such as a WiFi network, a Bluetooth™ network or a cellular data network. During operation, the mobile applications send various types of usage metrics (which are described in more detail below) to mobile server 210. Mobile server 210 in turn forwards this metrics information through a proxy 222 onto a communications bus 224. These usage metrics are ultimately stored in storage system 228 and can also be processed using various filters 226 to detect certain types of page views and/or actions, or patterns of page views and/or actions. Although the illustrated embodiment shows only two mobile devices, in general there can be a large number of mobile devices and associated mobile application instances (possibly thousands or millions) that simultaneously send usage information through communications bus 224 to storage system 228.

Note that the usage information can be sent to mobile server 210 whenever it is generated by the mobile applications. Alternatively, the usage information can be aggregated on mobile devices 204 and 208 and can be sent periodically to mobile server 210 in larger blocks.

Also, desktop systems 214 and 218, which are operated by users 212 and 216, respectively, can periodically transmit usage metrics to desktop server 220, and desktop server 220 can forward this usage information to communications bus 224. This usage information from desktop systems 214 and 218 can similarly be stored in storage device 228 and can also be processed by filters 226.

If desktop server 220 hosts a website, which is accessed through browsers on desktop systems 214 and 218, then the website can possibly gather the usage metrics instead of relying on XML or HTML code in the browsers to gather the usage information. This website can keep track of how a specific user navigates through the website. However, note that a web server that is located on desktop server 220 may not be able to easily access some types of tracking information, such as the operating system or associated model numbers for desktop systems 214 and 218.

Communications bus 224, proxy 222, filters 226 and storage device 228 can be located on one or more servers distributed across a network. Also, mobile server 210, desktop server 220, proxy 222, communications bus 224, filters 226 and storage device 228 can be hosted in a virtualized cloud-computing system.

Usage metrics 229 from storage device 228 feed into a recommendation workflow 230, which generates per-user recommendations for navigation options, and these recommendations are stored in a key-value storage system 232. Mobile server 210 can then perform queries on key-value storage system 232 to obtain recommendations. Mobile server 210 can also map the recommendations to navigation items to be displayed to the user through a mobile application.

Mobile Device

Figure 3:
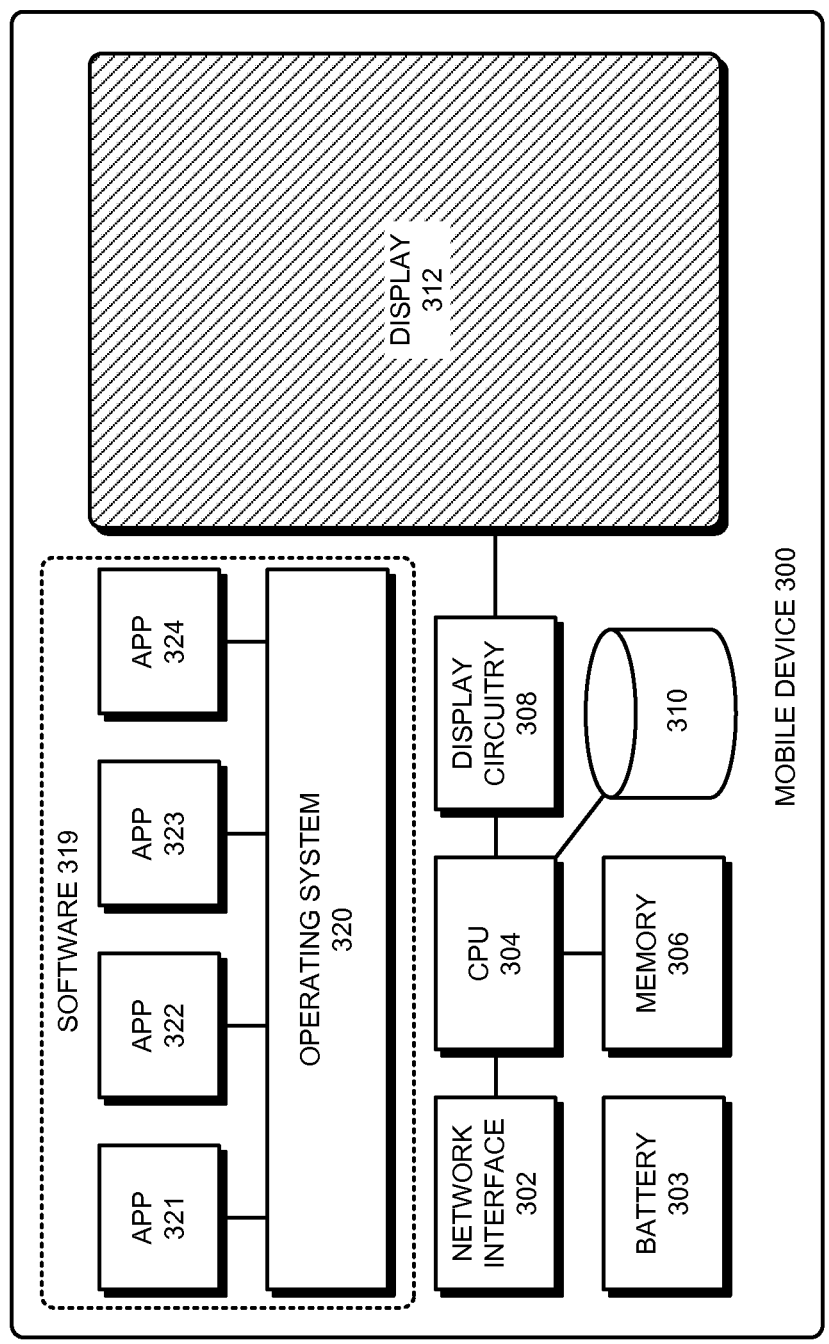
FIG. 3 illustrates a mobile device in accordance with the disclosed embodiments.

FIG. 3 illustrates the internal structure of a mobile device 300 in accordance with the disclosed embodiments. Mobile device 300 includes a number of hardware components, including a network interface 302, a battery 303, a central-processing unit (CPU) 304, a memory 306, a non-volatile storage device 310, display circuitry 308, and a display 312. Network interface 302 can include any type of circuitry for interfacing with a network, such as a WiFi network, a 3G or 4G data network, a Bluetooth™ network, or generally any type of wireless or wired communication network. Battery 303 can generally include any type of rechargeable (or non-rechargeable battery) that is used to power mobile device 300. CPU 304 can generally include any type of single-core or multi-core processing engine. Memory 306 can generally include any type of random-access memory that can store code and data to be used or manipulated by CPU 304. Display circuitry 308 can generally include any type of graphics-processing and amplification circuitry for driving display 312. Finally, display 312 can include any type of display that can be incorporated into mobile device 300, such as the touchscreen (or non-touchcreen) display for a smartphone or a tablet computer.

Mobile device 300 also includes various software components 319, including an operating system 320, which can be used to execute various mobile applications 321-324. For example, these mobile applications possibly output various types of tracking information as is described in more detail below. Furthermore, the operating system can include the Android™ operating system distributed by Google, Inc. of Mountain View, Calif., the iOS™ operating system distributed by Apple Inc. of Cupertino, Calif., the Windows Phone™ operating system distributed by Microsoft, Inc. of Redmond, Wash., or the BlackBerry OS™ distributed by BlackBerry Ltd. of Waterloo, Ontario, Canada. Moreover, mobile applications 321-324 can include mobile applications which can run on the Android™, iOS™, Windows Phone™ or BlackBerry OS™ operating systems.

Tracking Information

FIG. 4 illustrates usage data including page-specific tracking information 402 and action-specific tracking information 412 in accordance with the disclosed embodiments. Page-specific tracking information 402 is outputted whenever a page is loaded during execution of the mobile application. This page-loading operation can include: refreshing a page; loading a new page; returning to a previously accessed page; or crossing a window boundary when scrolling through a large page. As illustrated in FIG. 4, page-specific tracking information 402 can include an identifier for a page 404, which can be a numeric value such as a sequence number for the page or a link to the page. It can also include an identifier for an action 406 that caused the page to be loaded. For example, the action can include tapping, pulling, scrolling or swiping a location associated with a page. Note that the action ID 406 can also specify the page where the action took place.

Page-specific tracking information 402 can also include additional tracking information 408. This additional tracking information 408 can include: a version number for the mobile application; a model number for the mobile device; an operating system and associated version number; a session identifier; an identifier for a carrier associated with the mobile device; a timestamp; an orientation of the mobile device, which can include portrait or landscape; a language setting associated with the mobile application or the mobile device; position information for a user interface element associated with the mobile application; and color information for a user interface element associated with the mobile application.

Action-specific tracking information 412 is outputted whenever a user performs an action, such as tapping on a button on a page. Action-specific tracking information 412 can include an identifier for the action 414, which for example can be a numeric value or a character string that identifies the action. It also includes an identifier for a page or widget 416 where the action took place. (Note that a widget is a user interface element associated with the mobile application that is not a page of the mobile application.) Action-specific tracking information 412 can also include additional tracking information 418, which can be similar to additional tracking information 408 described above.

Process of Generating Personalized Navigation Options

Figure 5:
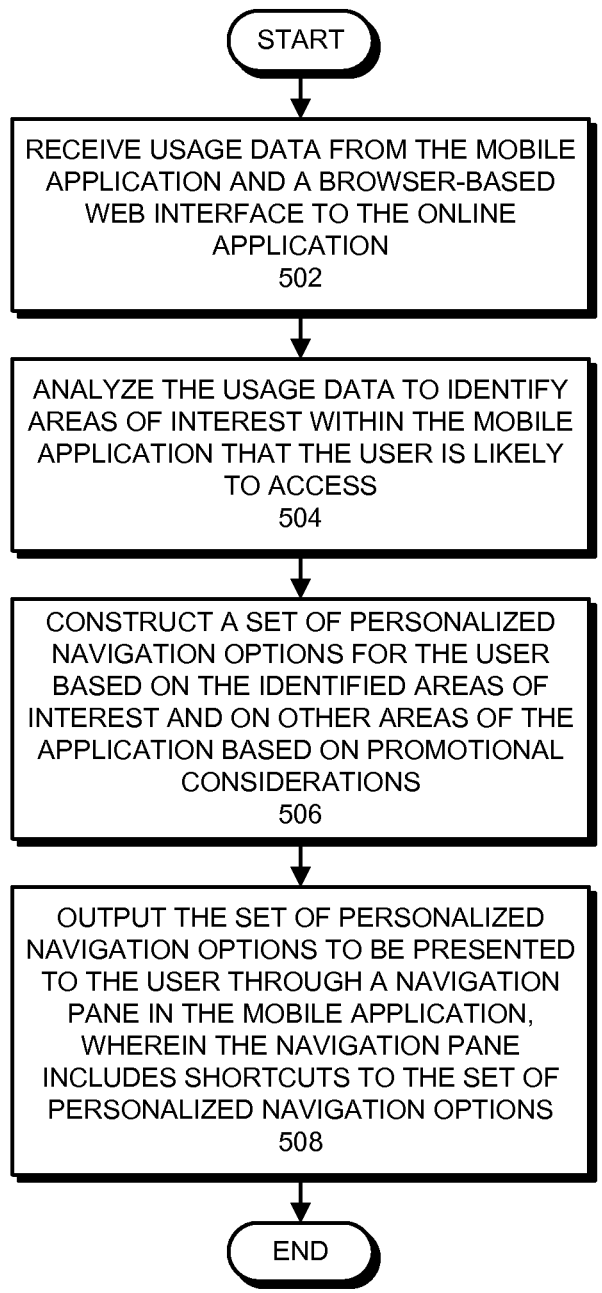
FIG. 5 presents a flow chart illustrating the process of personalizing navigation options in accordance with the disclosed embodiments.

FIG. 5 presents a flow chart illustrating the process of personalizing navigation options in accordance with the disclosed embodiments. At the start of the process, the system receives usage data comprising a record of actions performed while the user was interacting with the mobile application (step 502). As mentioned above, this usage data can originate from a mobile application that operates on a smartphone or tablet computer, or alternatively it can originate from a browser-based web interface that interacts with the same online application from a laptop or desktop system. For example, there can be separate streams of usage data from smartphone-based mobile applications, from tablet-based mobile applications, and from browser-based web interfaces that operate on desktop computer systems. In some embodiments, the usage data only originates from applications that are operated by the user.

In other embodiments, the usage data is also received from applications that are operated by other users who are related to the user. For example, the related users can include users who have similar profiles to the user, or users who are linked to the user through a social-networking application. Note that including usage information from related users increases the amount of usage information that is available to be analyzed by the system. This can lead to more accurate predictions about where the user is likely to navigate to in the application, especially in situations where very little usage data exists for the user.

Next, the system analyzes the usage data to identify areas of interest within the mobile application that the user is likely to access (step 504). Note that, in some contexts, an area of interest is referred to as a "product group." An identified area of interest can be used to generate a navigation option, which the user can select to navigate to the area of interest. The process of identifying an area of interest is described in more detail below with reference to the diagram in FIG. 6.

Next, the system constructs a set of personalized navigation options for the user based on the identified areas of interest and possibly on other areas of the application for promotional purposes (step 506). These "promotion-related" areas of the application can include areas associated with advertisers or sponsors, or promoting new features of the application. Note that the system can probabilistically select a promotional navigation option with a certain probabilistic weight, so that the promotional navigation option appears a certain percentage of the time.

Finally, the system sends the personalized navigation options to an instance of the mobile application on a mobile device associated with the user. The mobile application can present the set of personalized navigation options to the user through a navigation pane in the mobile application, wherein the navigation pane includes shortcuts to the set of personalized navigation options (step 508).

Process of Selecting a Navigation Option

Figure 6:
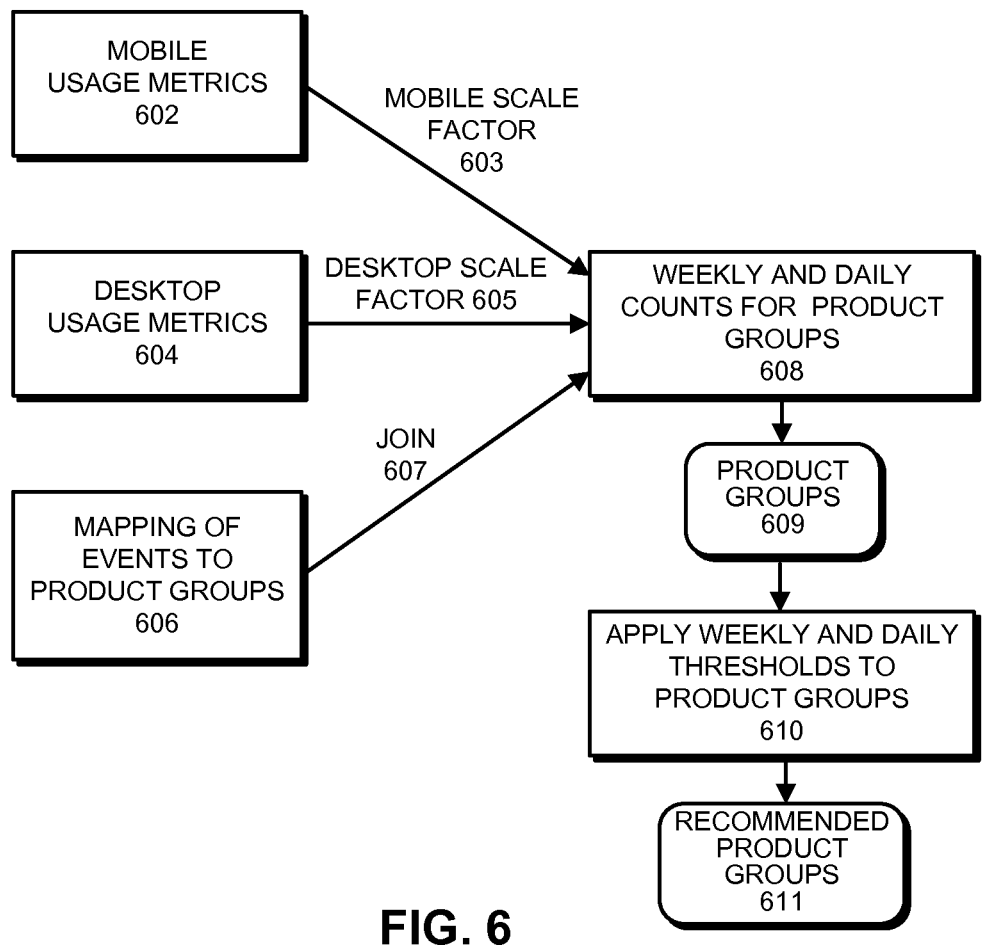
FIG. 6 illustrates how usage-based navigation options are selected in accordance with the disclosed embodiments.

FIG. 6 illustrates how usage-based navigation options are selected in accordance with the disclosed embodiments. Note that this selection process can take place on a mobile server 210 associated with a mobile device, or alternatively on the mobile device itself. During this selection process, the system receives mobile usage metrics 602, which can include events (such as user actions and page loads) generated by the mobile application while the user is operating the mobile application. The system can also receive desktop usage metrics 604, which can include corresponding events generated while the user was accessing a corresponding desktop application or a browser-based web interface to the online application. The mobile usage metrics 602 can be associated with a mobile scale factor 603, which can be used to weight the mobile usage metrics 602. Similarly, a desktop scale factor 605 can be used to weight the desktop usage metrics 604. For example, if the system is generating recommendations for a mobile application, the system can weight the mobile usage metrics 602 more heavily than the desktop usage metrics 604.

The system also receives a mapping of the events to specific product groups 606, wherein a product group is associated with an area of the application comprising one or more pages of the application. Note that if the events generated by the user are associated with the specific product group, it is likely that the user will want to navigate to an associated area of the application. For example, for a social-networking application, product groups can include "people you may know," "connections," or "companies." The received mapping can be used to perform a join operation 607 to associate a specific event, such as a user tapping a specific button on a page of a mobile application, with a specific product group.

After the events are associated with product groups, the system generates counts for the product groups (step 608), wherein the counts are associated with specific time intervals. For example, for each product group, the system can keep track of the number of weeks in the preceding three months that the product group was accessed, as well as the number of times the product group was accessed during the past week. The system can additionally keep track of the total number of times the product group was accessed during the preceding three months. This count-generating process produces a set of product groups 609 with associated access histories.

Next, the system can apply weekly and daily thresholds to each of the product groups (step 610) to produce a set of recommended product groups 611, which includes product groups that meet these thresholds, and excludes other product groups. For example, the system can include product groups that were accessed in at least five different weeks during the past three months, or that were accessed at least eight times during the past week. As mentioned above, each product group is associated with an area of the application, so a recommended product group can be used to generate a shortcut to the associated area of the application.

Note that the process of selecting product groups can include a probabilistic component that occasionally selects a random product group to create a navigation operation. It is advantageous to periodically display random navigation options to the user; otherwise, the system tends to only present the user with navigation options that the user has viewed before. By periodically viewing a small number of different navigation options, the user is more likely to navigate to unexplored areas of the application, and the user may find some useful functionality or content in these unexplored areas.

In some embodiments, the concept of recommending product groups (referred to as "branches") as navigation items can be extended to include specific pages in a product group (referred to as "leaves"). Some examples of leaves include "Stanford Alumni Group," "Apple Company Page," or "John Doe's Profile Page." The process for making leaf recommendations is similar to the process for branches, except that the system starts with all the metrics corresponding to the parent product group, generates weekly/daily counts for all the leaves in the parent product group, and then recommends leaves that exceed the threshold values. The system can also perform this process for each parent product group that the system decides to recommend leaves for.

Exemplary User Interface for Mobile Application

Figure 7:
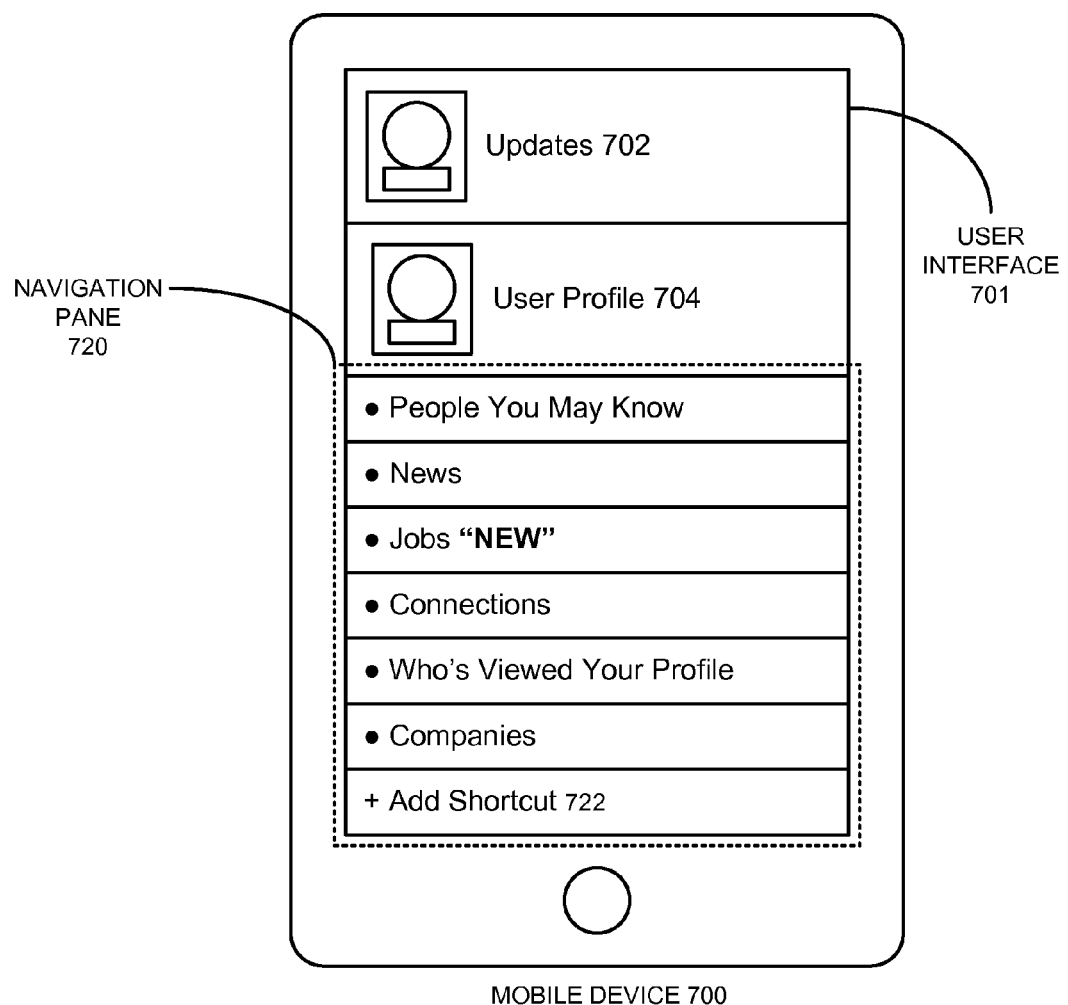
FIG. 7 illustrates an exemplary UI on a mobile device in accordance with the disclosed embodiments.

FIG. 7 illustrates an exemplary user interface (UI) 701 on a mobile application, which operates on a mobile device 700 in accordance with the disclosed embodiments. More specifically, FIG. 7 illustrates a page of a user interface 701, which includes a number of fixed interface elements, including updates 702 and user profile 704. It also includes a navigation pane 720, which contains a number of shortcuts to different areas of the application which are associated with different product groups, such as "people you may know," "news," "jobs," "connections," "who's viewed your profile" and "companies." By tapping on these shortcuts, the user can easily navigate to an associated area of the application. Navigation pane 720 also includes an "add shortcut" button 722, which, when selected, presents a comprehensive list of possible navigation options to the user. If a user selects an item from this comprehensive list, the item can be added to navigation pane 720.

Although navigation pane 720 in FIG. 7 is illustrated as a linear list of shortcuts, there are many different possible layouts for navigation pane 720. For example, navigation pane 720 can be implemented as a two-dimensional grid of shortcuts, which may be advantageous for a user interface on a tablet computer.

Also, the shortcuts in navigation pane 720 can be organized in a sorted order based on likelihood of access, wherein shortcuts that are more likely to be accessed are placed at the top of the list and shortcuts that are less likely to be accessed are placed at the bottom of the list.

Also, note that navigation pane 720 can scroll. Hence, if there are more shortcuts in navigation pane 720 than can fit within the limited window of space allocated to navigation pane 720 within UI 701, then some of the shortcuts may scroll out of view, and a subsequent scrolling operation will be required to access them.

Note that the "Jobs" shortcut is marked as "NEW." This informs the user that the "Jobs" shortcut was recently added to navigation pane 720. Also note that a new shortcut can also be marked in a number of different ways, including by using a different color.

This paradigm of customizing a mobile application based on usage data is not necessarily limited to navigation options. In general, the usage data can be applied to customize any aspect of the interaction between the user and the mobile application. For example, the usage data can influence the way data is presented to the user. For example, if the user is a recruiter, when the recruiter is viewing a profile of a prospective employee, the recruiter may be most interested in knowing where the prospective recruit went to school. In this case, the college that the prospective employee graduated from should ideally appear near the top of the prospective employee's profile.

The foregoing descriptions of disclosed embodiments have been presented only for purposes of illustration and description. They are not intended to be exhaustive or to limit the disclosed embodiments to the forms disclosed. Accordingly, many modifications and variations will be apparent to practitioners skilled in the art. Additionally, the above disclosure is not intended to limit the disclosed embodiments. The scope of the disclosed embodiments is defined by the appended claims.

What is claimed is:

1. A computer-implemented method for presenting navigation options to a user of a mobile application, the method comprising:

receiving usage data of the user comprising mobile usage metrics and desktop usage metrics, wherein the mobile and desktop usage metrics comprise a record of actions performed while the user was interacting with the mobile application and a corresponding desktop application, and wherein the mobile usage metrics are associated with a mobile scale factor that is higher than a desktop scale factor associated with the desktop usage metrics;

analyzing the usage data to identify areas of interest within the mobile application that the user is likely to access, wherein an area of interest is associated with a product group, wherein a product group is associated with portions of the mobile application that provide a specific type of functionality or content, and wherein the mobile usage metrics are weighted more than the desktop usage metrics when identifying the areas of interest;

constructing a set of personalized navigation options for the user based on the identified areas of interest; and outputting the set of personalized navigation options to be presented to the user through a navigation pane in the mobile application, wherein the navigation pane includes shortcuts to the set of personalized navigation options.

2. The computer-implemented method of claim 1, wherein the method is performed by a server associated with the mobile application, and wherein outputting the set of personalized navigation options involves sending the set of personalized navigation options to the mobile application.

3. The computer-implemented method of claim 1, wherein the method is performed by the mobile device.

4. The computer-implemented method of claim 1, wherein constructing the set of personalized navigation options also involves including navigation options associated with other areas of the application based on promotional considerations instead of usage data.

5. The computer-implemented method of claim 1, wherein the navigation pane is one of:

an ordered list containing shortcuts to the set of personalized navigation options; and an ordered grid containing shortcuts to the set of personalized navigation options.

6. The computer-implemented method of claim 1, wherein the navigation pane includes an add-shortcut option, which when selected presents a comprehensive list of possible navigation options to the user.

7. The computer-implemented method of claim 1, wherein if the navigation pane includes a new shortcut that did not appear in a previous navigation pane, the new shortcut is highlighted to make the user aware that the shortcut is new.

8. The computer-implemented method of claim 1, wherein the mobile application acts as an interface to an online application that can also be accessed through a browser-based web interface; and wherein the usage data also includes usage data obtained through the web interface.

9. The computer-implemented method of claim 1, wherein the usage data also includes usage data for related users, wherein the related users can include users that are connected with the user through links in an online social-networking application, or users who have a similar personal profile to the user.

10. The computer-implemented method of claim 1, wherein the method is performed periodically so that the set of personalized navigation options dynamically evolves over time.

11. The computer-implemented method of claim 1, wherein analyzing the usage data involves using a machine-learning technique to analyze the usage data to identify the areas of interest for the user.

12. The computer-implemented method of claim 1, wherein the usage data includes a record of page loads and user actions that occurred while the user was interacting with the mobile application.

13. The computer-implemented method of claim 1, wherein the shortcuts in the navigation pane are presented in an ordering that is based on likelihood of user access.

14. A non-transitory computer-readable storage medium storing instructions that when executed by a computer cause the computer to perform a method for presenting navigation options to a user of a mobile application, the method comprising:

receiving usage data of the user comprising mobile usage metrics and desktop usage metrics, wherein the mobile and desktop usage metrics comprise a record of actions performed while the user was interacting with the mobile application and a corresponding desktop application, and wherein the mobile usage metrics are associated with a mobile scale factor that is higher than a desktop scale factor associated with the desktop usage metrics;

analyzing the usage data to identify areas of interest within the mobile application that the user is likely to access, wherein an area of interest is associated with a product group, wherein a product group is associated with portions of the mobile application that provide a specific type of functionality or content, and wherein the mobile usage metrics are weighted more than the desktop usage metrics when identifying the areas of interest;

constructing a set of personalized navigation options for the user based on the identified areas of interest; and outputting the set of personalized navigation options to be presented to the user through a navigation pane in the mobile application, wherein the navigation pane includes shortcuts to the set of personalized navigation options.

15. The non-transitory computer-readable storage medium of claim 14, wherein constructing the set of personalized navigation options also involves including navigation options associated with other areas of the application based on promotional considerations instead of usage data.

16. The non-transitory computer-readable storage medium of claim 14, wherein the navigation pane includes an add-shortcut option, which when selected presents a comprehensive list of possible navigation options to the user.

17. The non-transitory computer-readable storage medium of claim 14, wherein the mobile application acts as an interface to an online application that can also be accessed through a browser-based web interface; and wherein the usage data also includes usage data obtained through the web interface.

18. The non-transitory computer-readable storage medium of claim 14, wherein the usage data also includes usage data for related users, wherein the related users can include users that are connected with the user through links in an online social-networking application, or users who have a similar personal profile to the user.

19. The non-transitory computer-readable storage medium of claim 14, wherein the method is performed periodically so that the set of personalized navigation options dynamically evolves over time.

20. The non-transitory computer-readable storage medium of claim 14, wherein analyzing the usage data involves using a machine-learning technique to analyze the usage data to identify the areas of interest for the user.

21. A system that facilitates presenting navigation options to a user of a mobile application, comprising:
   a processor;
   a memory; and
   code that executes using the processor and the memory, wherein the code is configured to,
      receive usage data of the user comprising mobile usage metrics and desktop usage metrics, wherein the mobile and desktop usage metrics comprises a record of actions performed while the user was interacting with the mobile application and a corresponding desktop application, and wherein the mobile usage metrics are associated with a mobile scale factor that is higher than a desktop scale factor associated with the desktop usage metrics;
      analyze the usage data to identify areas of interest within the mobile application that the user is likely to access, wherein an area of interest is associated with a product group, wherein a product group is associated with portions of the mobile application that provide a specific type of functionality or content, and wherein the mobile usage metrics are weighted more than the desktop usage metrics when identifying the areas of interest;
      construct a set of personalized navigation options for the user based on the identified areas of interest; and
      output the set of personalized navigation options to be presented to the user through a navigation pane in the mobile application, wherein the navigation pane includes shortcuts to the set of personalized navigation options.

\* \* \* \* \*